United States Patent
Pancha et al.

(10) Patent No.: US 11,372,842 B2
(45) Date of Patent: Jun. 28, 2022

(54) PRIORITIZATION OF DATA IN MOUNTED FILESYSTEMS FOR FSCK OPERATIONS

(71) Applicant: International Business Machines Corporation, Armonk, NY (US)

(72) Inventors: Huzefa Pancha, Pune (IN); Karthik Iyer, Bangalore (IN); Sandeep Ramesh Patil, Pune (IN); Sasikanth Eda, Vijayawada (IN); Abhishek Jain, Baraut (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/892,944

(22) Filed: Jun. 4, 2020

(65) Prior Publication Data

US 2021/0382869 A1 Dec. 9, 2021

(51) Int. Cl.
*G06F 16/23* (2019.01)
*G06F 16/11* (2019.01)
*G06F 16/17* (2019.01)

(52) U.S. Cl.
CPC .......... *G06F 16/2365* (2019.01); *G06F 16/11* (2019.01); *G06F 16/1734* (2019.01)

(58) Field of Classification Search
CPC .. G06F 16/2365; G06F 16/11; G06F 16/1734; G06F 3/061; G06F 3/064; G06F 3/0659; G06F 3/067; G06F 3/0689
See application file for complete search history.

(56) References Cited

U.S. PATENT DOCUMENTS

| | | | | |
|---|---|---|---|---|
| 5,727,206 A * | 3/1998 | Fish | ..................... | G06F 11/1435 714/4.2 |
| 5,828,876 A * | 10/1998 | Fish | ..................... | G06F 16/1858 710/200 |
| 6,389,420 B1 * | 5/2002 | Vahalia | ............... | G06F 16/1774 709/248 |
| 6,732,124 B1 * | 5/2004 | Koseki | ................ | G06F 11/1435 711/119 |
| 9,164,855 B1 * | 10/2015 | Cousins | ................ | G06F 3/0689 |
| 2003/0018712 A1 * | 1/2003 | Harrow | ............... | H04L 67/1072 709/203 |
| 2003/0200275 A1 * | 10/2003 | Hirabayashi | ........ | H04L 67/1097 709/214 |

(Continued)

FOREIGN PATENT DOCUMENTS

WO WO-2010050944 A1 * 5/2010 .......... G06F 11/0727

OTHER PUBLICATIONS

Domingo, D., Kannan, S., & Stratton, K. (2020). Accelerating Filesystem Checking and Repair with pFSCK. arXiv preprint arXiv: 2004.05524. (Year: 2020).*

(Continued)

*Primary Examiner* — Dennis Truong
(74) *Attorney, Agent, or Firm* — Kunzler Bean & Adamson

(57) ABSTRACT

A method for prioritizing data in mounted filesystems for FSCK operations is disclosed. An apparatus and computer program product also perform the functions of the method. In certain embodiments, the method includes selecting a prioritization mode from a plurality of prioritization modes, assigning a rank, based on the selected prioritization mode, to files in a file system, and analyzing, according to the assigned rank, the files to identify corrupted files.

20 Claims, 5 Drawing Sheets

(56) References Cited

U.S. PATENT DOCUMENTS

| | | | |
|---|---|---|---|
| 2005/0114297 A1 | 5/2005 | Edwards | |
| 2007/0061327 A1* | 3/2007 | Oscherov | H04L 67/28 |
| 2008/0177994 A1* | 7/2008 | Mayer | G06F 9/4418 |
| | | | 713/2 |
| 2008/0222078 A1* | 9/2008 | Godbole | G06F 16/10 |
| 2009/0089628 A1* | 4/2009 | Day | G06F 11/0727 |
| | | | 714/54 |
| 2009/0106327 A1 | 4/2009 | Dilman et al. | |
| 2009/0106578 A1* | 4/2009 | Dilman | G06F 11/0793 |
| | | | 714/2 |
| 2009/0106603 A1* | 4/2009 | Dilman | G06F 11/327 |
| | | | 714/E11.002 |
| 2009/0144283 A1* | 6/2009 | Clark | G06F 16/54 |
| 2012/0089651 A1* | 4/2012 | Hahn | G06F 16/1737 |
| | | | 707/822 |
| 2012/0131012 A1* | 5/2012 | Taylor | G06F 16/14 |
| | | | 707/748 |
| 2014/0304576 A1* | 10/2014 | Walton | G06F 16/435 |
| | | | 715/201 |
| 2015/0331753 A1* | 11/2015 | Nakajima | G06F 11/1415 |
| | | | 714/15 |
| 2017/0147626 A1 | 5/2017 | Ali et al. | |
| 2018/0052637 A1* | 2/2018 | Chen | G06F 16/22 |
| 2018/0293265 A1* | 10/2018 | Eda | G06F 16/162 |
| 2020/0012553 A1* | 1/2020 | Subhedar | G06F 11/0793 |
| 2020/0183912 A1* | 6/2020 | Raju | G06F 21/64 |

OTHER PUBLICATIONS

MK Mckusick Fsck—The UNIXt File System Check Program; https://docs.freebsd.org/44doc/smm/03.fsck/paper.pdf; Oct. 7, 1996 (Year: 1996).*

\* cited by examiner

PRIORITIZATION OF DATA IN MOUNTED FILESYSTEMS FOR FSCK OPERATIONS

FIELD

The subject matter disclosed herein relates to an improved data processing apparatus and method and more specifically to prioritization of data in mounted filesystems for FSCK operations.

BACKGROUND

File systems facilitate storing and retrieving data organized in a hierarchical structure of files and directories. Data managed by a file system can be held in blocks on persistent storage devices such as disk drives. As the sheer volume of data in today's information-based society continues to increase, so too do file system corruptions that degrade performance of the file system.

One tool for correcting file system corruption is known as File System Consistency Check ("FSCK"). FSCK is a tool for checking the consistency of a file system in UNIX™ and Unix-like operating systems. A similar tool exists in Windows®-based operating systems. Generally, FSCK is run automatically based on need or a predetermined schedule, or manually by a system administrator. FSCK operates in one of two modes, either offline or online. The online mode operates on a mounted file system, while the offline mode operates on an unmounted file system. However, FSCK, when operating in the online mode, locks files that are being scanned so that other threads/processes are unable to modify the files while FSCK is running. This may cause a performance degradation of the file system.

BRIEF SUMMARY

A method for prioritizing data in mounted filesystems for FSCK operations is disclosed. An apparatus and computer program product also perform the functions of the method. In certain embodiments, the method includes selecting a prioritization mode from a plurality of prioritization modes, assigning a rank, based on the selected prioritization mode, to files in a file system, and analyzing, according to the assigned rank, the files to identify corrupted files.

In certain examples, the method also includes assigning the rank of each of the files in response to a probability based on recent file access, or assigning the rank of each of the files in response to a history based on a time of access of the files. In certain examples, the method may include assigning the rank of each of the files in response to a history based on access frequency. In other examples, the method includes determining a backup status of each of the files, and assigning the rank to each of the files based on the determined backup status.

In certain examples, the method includes determining a location of each of the files, and assigning the rank to each of the files based on the determined location. Further, the a file system consistency check (FSCK) utility is operable on a computing node that is configured to store a portion of the file system, and where the method further includes assigning a higher rank to files of the file system that are located on a same computing node as the FSCK utility.

In certain examples, the method includes moving the FSCK utility to a second computing node. The selected prioritization mode comprises a weighted combination of a first prioritization mode and a second prioritization mode.

BRIEF DESCRIPTION OF THE DRAWINGS

In order that the advantages of the embodiments of the disclosure will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
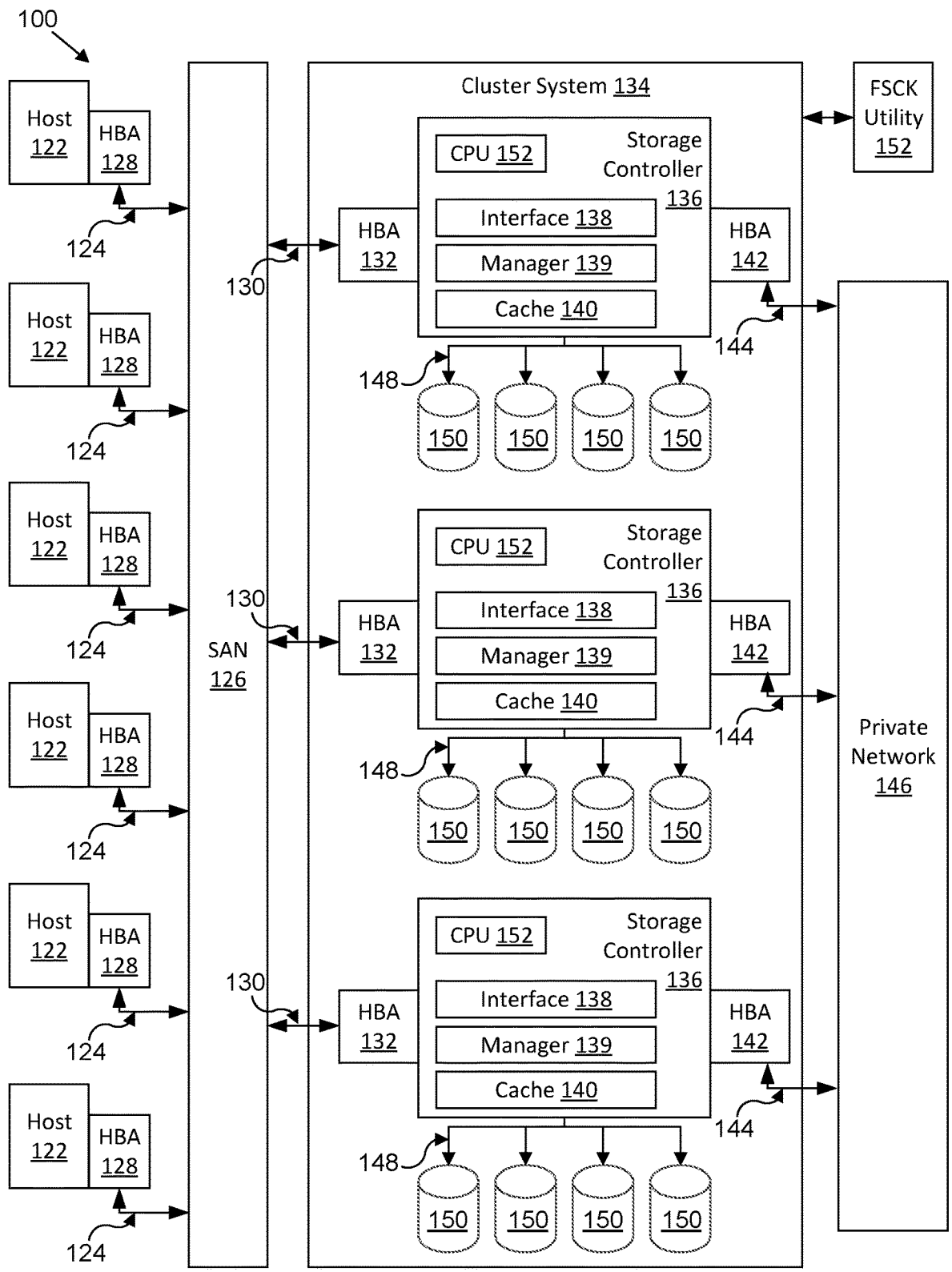
FIG. 1 is a schematic block diagram that illustrates one embodiment of a storage system in accordance with embodiments of the present disclosure.

Disclosed herein are various embodiments providing methods, systems, and computer program products that can prioritize data in mounted filesystems for FSCK operations.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present technology are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 is a schematic block diagram that illustrates one embodiment of a storage system 100 in accordance with embodiments of the present disclosure. In certain embodiments, the storage system 100 includes a cluster system 134 having multiple storage controllers 136 configured to manage storage volumes for the storage system 100.

The cluster system 134 receives, from one or more host computers 122, input/output (I/O) requests, which are commands to read or write data at logical addresses on logical volumes. Any number of host computers 122 are coupled to the storage system 100 by any means known in the art, for example, using a network. Using the network, any host computer 122 can communicate a request to perform an I/O operation to the cluster system 134. Herein, by way of example, host computers 122 and the storage system 100 are assumed to be coupled by a Storage Area Network (SAN) 126 incorporating data connections 124 and Host Bus Adapters (HBAs) 128. The logical addresses specify a range of data blocks within a logical volume. For example, each block may contain 512 bytes, or 1024 bytes, etc. For example, a 10 KB data record used in a data processing application on a given host computer 122 that may require 20 blocks (depending on the block size), which the given host computer might specify as being stored at a logical address comprising blocks 1,000 through 1,019 of a logical volume. Storage system 100 may operate in, or as, a SAN system.

The cluster system 134 may be coupled between the SAN 126 and a private network 146 using data connections 130 and 144, respectively, and incorporating adapters 132 and 142, again respectively. In some configurations, adapters 132 and 142 may comprise host bus adapters (HBAs). The cluster system 134 implements multiple storage controller 136, each of which includes a processor 152, an interface 138 (in communication between adapters 132 and 142), a manager 139, and a cache 140. Each storage controller 136 is responsible for a number of storage devices 150 by way of a data connection 1 48 as shown.

Each storage controller 136 further comprises a given cache 140. However, it will be appreciated that the number of caches 140 used in the cluster system 134 may be any convenient number. While all caches 140 in the cluster system 134 may operate in substantially the same manner and comprise substantially similar elements, this is not a requirement. Each of the caches 140 may be approximately equal in size and it is assumed to be coupled, by way of example, in a one-to-one correspondence with a set of physical storage devices 150, which may comprise disks. In one embodiment, physical storage devices may comprise such disks. Those skilled in the art will be able to adapt the description herein to caches of different sizes.

Each set of storage devices 150 comprises multiple slow and/or fast access time mass storage devices, herein below assumed to be multiple hard disks. FIG. 1 shows caches 140 coupled to respective sets of storage devices 150. In some configurations, the sets of storage devices 150 comprise one or more hard disks, or solid-state drives (SSDs) which can have different performance characteristics. In response to an I/O command, a given cache 140, by way of example, may read or write data at addressable physical locations of a given storage device 150. In the depicted embodiment, caches 140 are able to exercise certain control functions over storage devices 150. These control functions may alternatively be realized by hardware devices such as disk controllers (not shown), which are linked to caches 140.

Each storage controller 136 is operative to monitor its state, including the states of associated caches 140, and to transmit configuration information to other components of the cluster system 134 for example, configuration changes that result in blocking intervals, or limit the rate at which I/O requests for the sets of physical storage are accepted.

Routing of commands and data from HBAs 128 to the cluster system 134 and to each cache 140 may be performed over a network and/or a switch. Herein, by way of example, HBAs 128 may be coupled to storage controllers 136 by at least one switch (not shown) of the SAN 126, which can be of any known type having a digital cross-connect function. Additionally or alternatively, HBAs 128 may be coupled to storage modules.

In some embodiments, data having contiguous logical addresses can be distributed among storage controllers 136, and within the storage devices in each of the storage controllers 136. Alternatively, the data can be distributed using other algorithms, e.g., byte or block interleaving. In general, this increases bandwidth, for instance, by allowing a volume in a SAN or a file in network attached storage to be read from or written to more than one given storage device 150 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 150.

While such hardware is not explicitly shown for purposes of illustrative simplicity, the cluster system 134 may be adapted for implementation in conjunction with certain hardware, such as a rack mount system, a midplane, and/or a backplane. Indeed, the private network 146 in one embodiment may be implemented using a backplane. Additional hardware such as the aforementioned switches, processors, controllers, memory devices, and the like may also be incorporated into the cluster system 134 and elsewhere within storage system 100, again as the skilled artisan will appreciate. Further, a variety of software components, operating systems, firmware, and the like may be integrated into one storage system 100. In further examples, the cluster system 134 may be distributed across different geographic locations.

The storage devices 150 may comprise a combination of high capacity hard disk drives and solid-state disk drives. In some embodiments each of storage devices 150 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid-state disk drives. While the configuration in FIG. 1 shows the cluster system 134 having three storage controllers 136 and each of those coupled to four storage devices 150, a given storage system 134 comprising any multiple of storage controllers 136 coupled to any plurality of storage devices 150 is considered to be with the spirit and scope of the present disclosure.

Also depicted is a file system consistency checking (FSCK) utility 153. The FSCK utility is configured to analyze a file system of the storage devices and resolve corruption issues. In a LINUX™/UNIX™ file system, the basic unit of storage is called an inode. Each inode contains unique information about a file including: its inode number (a unique identification number); the owner and group associated with the file; the file type (e.g., file or folder/directory); the file's permission list; the file creation, access, and modification times; the size of the file; and the disk address. The FSCK utility 153 is configured to analyze inodes and resolve corruption issues by, for example, identifying inodes that are incorrectly listed in the list of used inodes. Other types of inode corruption are known. The FSCK utility 153 of the current disclosure will be described in greater detail below.

Figure 2:
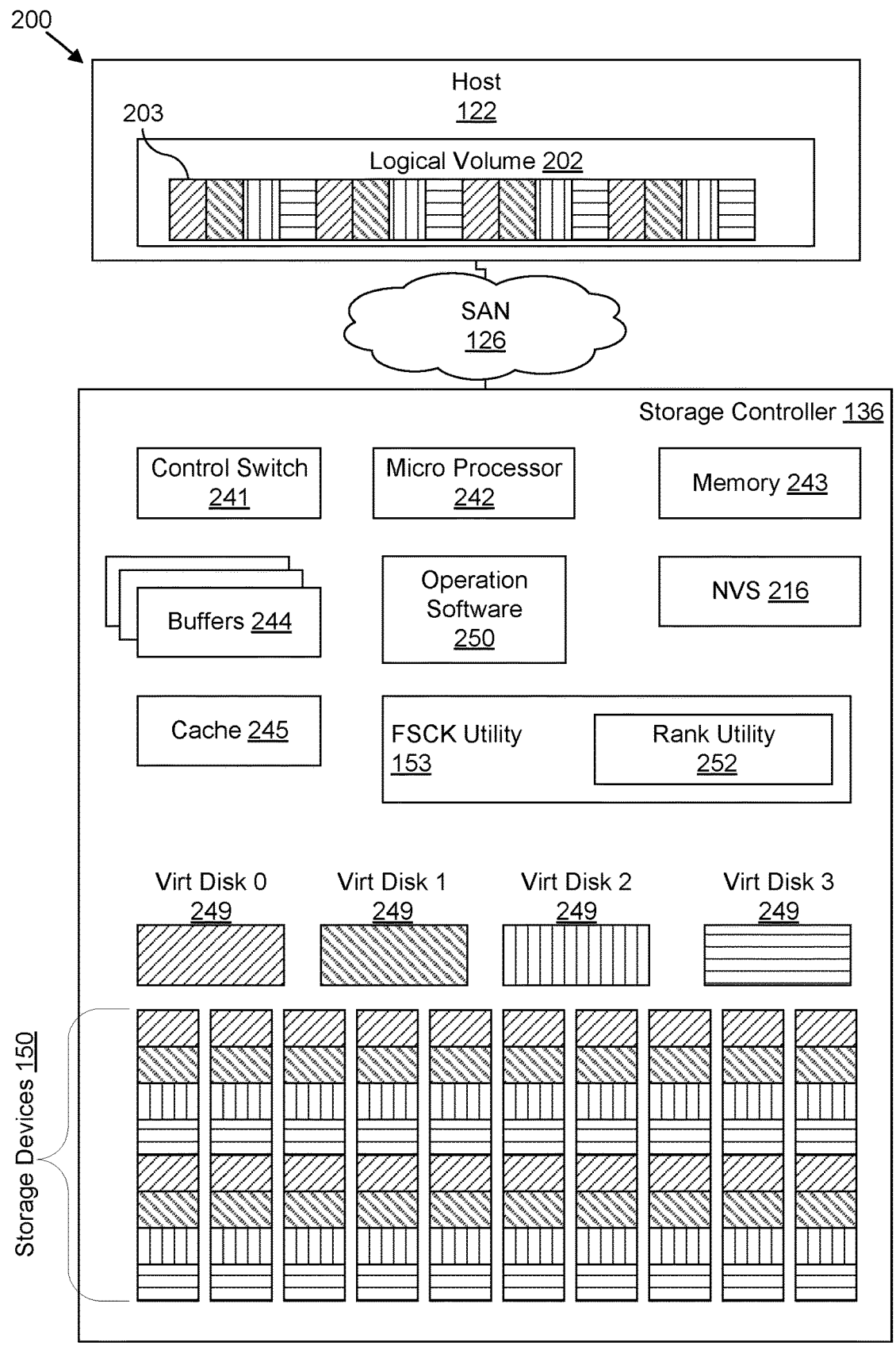
FIG. 2 is block diagram illustrating another embodiment of a system utilizing a communication system to access cluster-based storage systems in accordance with embodiments of the present disclosure.

FIG. 2 is block diagram illustrating another embodiment of a system 200 utilizing a communication system to access cluster-based storage systems in accordance with embodiments of the present disclosure. In particular, the system 200 includes a data storage and management system (specifically, portions of a SAN) that may be used in the overall context of mandatory atomic operations in accordance with the present disclosure. Information handling devices ("hosts") 122 perform IO processing as part of the data storage system 200. The cluster hosts/nodes (physical or virtual devices) 122 may be one or more new physical devices or logical devices to accomplish the purposes of the present disclosure in the data storage system 200.

The data network (SAN 126) may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 122 may be local or distributed among one or more locations and may be equipped with any type of fabric (or fabric channel) (not shown in FIG. 2) or network connection to the storage controller 136, such as Fibre channel, FICON, ESCON, Ethernet, fiber optic, wireless, or coaxial adapters. Data storage system 200 is depicted in FIG. 2 comprising storage controllers 136 and cluster hosts 122. The cluster hosts 122 may include cluster nodes and other network components known to one of ordinary skill in the art.

To facilitate a clearer understanding of the methods described herein, the storage controller 136 is shown in FIG. 2 as a single processing unit, including a microprocessor 242, system memory 243 and nonvolatile storage ("NVS") 216. It is noted that in some embodiments, the storage controller 136 may include multiple processing units, each with their own processor complex and system memory, and interconnected by a dedicated network within the system 200.

Physical storage devices 150 may be comprised of one or more storage devices, such as storage arrays. As described above with reference to FIG. 1, the cluster system may include multiple storage controllers, with each storage controller having multiple storage devices 150. In alternative embodiments, a single storage controller 136 may handle all of the i/o requests of the hosts 122. The storage devices 150 are controlled by the storage controller 136 via a data connection such as a communication bus. While one data connection between components is shown for purposes of brevity, one of ordinary skill in the art will appreciate that any reasonable number of data connections, or "paths" may be found in a particular system or scenario in which data is transferred. These paths form the multipath architecture of storage networks in which the mechanisms of the present disclosure are concerned, among other aspects. In addition, alternate network paths appreciated by one of ordinary skill in the art may be found.

The system memory 243 of the storage controller 136 stores program instructions and data, which the processor 242 may access for executing functions and method steps of the present disclosure for executing and managing the storage devices 150 as described herein. In one embodiment, the system memory 243 includes, is in association with, or is in communication with, the operation software 250 for performing methods and operations described herein. As shown in FIG. 2, the system memory 243 may also include or be in communication with a cache 245 for storage 230, also referred to herein as a "cache memory", for buffering "write data" and "read data", which respectively refer to write/read requests and their associated data. In one embodiment, the cache 245 is allocated in a device external to the system memory 243, yet remains accessible by the microprocessor 242 and may serve to provide additional security against data loss, in addition to carrying out the operations as described in herein.

In some embodiments, the cache 245 is implemented with a volatile memory and nonvolatile memory and coupled to the microprocessor 242 via a local bus (not shown in FIG. 2) for enhanced performance of the data storage system 200. The NVS 216 included in the storage controller 136 is accessible by the microprocessor 242 and serves to provide additional support for operations and execution of the present disclosure as described in other figures. The NVS 216, may also referred to as a "persistent" cache, or "cache memory" and is implemented with nonvolatile memory that may or may not utilize external power to retain data stored therein. The NVS 216 may be stored in and with the cache 245 for any purposes suited to accomplish the objectives of the present disclosure.

In some embodiments, a backup power source (not shown in FIG. 2), such as a battery, supplies the NVS 216 with sufficient power to retain the data stored therein in case of power loss to data storage system 200. In certain embodiments, the capacity of the NVS 216 is less than or equal to the total capacity of the cache 245. Buffers 244 assist the cache 245 to read and write data, and a control switch 241 controls a protocol to control data transfer to or from the storage devices 246, the hosts 102, and other components in the storage controller 105. Multiple buffers 244 may be implemented with the present disclosure to assist with the operations as described herein.

The storage devices 150 may be physically comprised of one or more storage devices, such as storage arrays. A storage array is a logical grouping of individual storage devices, such as a hard disk. In certain embodiments, the storage devices 150 are comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

The storage controller 136 is configured to use the processor 242 cores to process host 122 IO operations in parallel for improved performance. IO operations may arrive in any order and overlap in terms of virtual disks 249 that the IO operations access.

The storage controller 136 may include operation software 250, the FSCK utility 153 and a rank utility 252. The operation software 250, FSCK utility 153 and rank utility 252 may work in conjunction with each and every component of the storage controller 136, the host 122, and the storage devices 150. The operation software 250, FSCK utility 153 and rank utility 252 may be structurally one complete module or may be associated and/or included with other individual modules. They may also be located in the cache 245 or other components of the storage controller 136.

The operation software 250, FSCK utility 153 and rank utility 252 may individually and/or collectively perform various aspects of the present disclosure as will be further described. For example, the operation software 250 may contain executable code for performing prioritization of files ahead of correcting file corruption. In certain embodiments, the FSCK utility 153 and rank utility 252 are part of the operating software 250 and perform the functions of prioritizing files.

Figure 3:
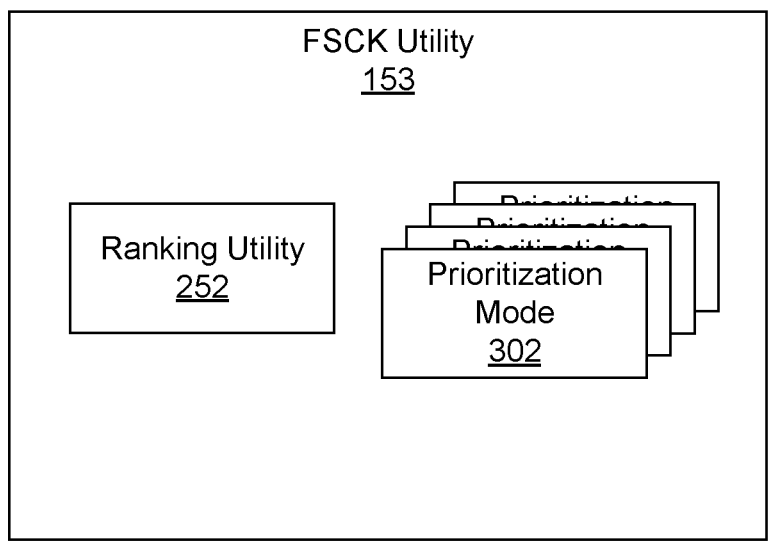
FIG. 3 is a schematic block diagram illustrating one embodiment of a FSCK utility, according to examples of the present disclosure.

FIG. 3 is a schematic block diagram illustrating one embodiment of the FSCK utility 153, according to examples of the present disclosure. The FSCK utility 153, as described above, is configured to finding and correcting corrupted storage objects in a file system. Data managed by a file system can be held in blocks on persistent storage devices such as disks. Metadata is used by the file system to track information such as, but not limited to, the location of allocated blocks, the amount and location of free space, mapping of file names to files, and other purposes. File system corruption degrades the performance of the file system. The FSCK utility 153 is configured to inspect the file system data/metadata and repair corrupted data/metadata.

The FSCK utility 153 is configured to operate in an offline mode and an online mode. The online mode operates on a mounted file system while the offline mode operates on unmounted file systems. Conventional FSCK utilities run on a mounted file system and take a lock on a single or a range of inodes before scanning so that no other process or application can perform I/O on these inodes, thereby making the associated data inaccessible for a period of time. Beneficially, the FSCK utility 153 of the current disclosure is configured to categorize/prioritize or rank the inodes (or file/directory objects) into different groupings/buckets based on one or more priority modes. This beneficially enhances the overall business continuity/availability of the file system for the hosts 122 trying to access the data.

The FSCK utility 153 is configured to detect file/directory inconsistencies such as, but not limited to, blocks marked allocated that do not belong to any file; files and directories for which an inode is allocated but no directory entry exists (e.g., orphaned files); directory entries that point to an inode that is not allocated; incorrectly formed directory entries (e.g., a directory file contains an inode number and a generation number of the file to which the inode number refers, but the generation number in the directory does not match the generation number stored in the inode); and incorrect link counts on files and directories; and other inconsistencies such as filesystem missing or corrupted metadata, directory structure related to volumes, missing or corrupted root directory, etc. The FSCK utility 153 is also configured to reclaim free blocks in an allocation map and fix inconsistencies that are found or report unrepaired blocks.

In certain examples, the ranking utility 252 is configured to rank or prioritize the files or directories of a mounted file system based on one or more prioritization modes 302. As described above, a mounted file system may be distributed across many storage devices 150, and even across many storage controllers 136 (or computing nodes) of a cluster system 134. The FSCK utility 153 is then, beneficially, configured to analyze objects according to the ranking to minimize an amount of time that the objects to be scanned are unavailable or locked by the FSCK utility 153.

In certain examples, the prioritization modes 302 are predetermined business requirements that help determine a ranking/weighting that is assigned to each inode or object. The ranking utility 252 may select one prioritization mode 302 over another prioritization mode 302. In another embodiment, the ranking utility 252 assigns a rank/priority to an object based on a combination of prioritization modes 302. For example, the ranking utility may consider a weighting mechanism in determining the ranking (e.g., Ranking=$0.8 \times \text{Priority}_1 + 0.2 \times \text{Priority}_2$).

One example of a prioritization mode 302 is to assign a rank based on a "near-time application usage." Stated differently, the ranking utility 252 is configured to identify files/directories/inodes which will be needed in a near future and prioritize these identified files/directories/inodes to be scanned first. Application data usage may be predicted by the ranking utility 252 by monitoring file usage. For example, if at a given time File A is accessed followed by access of File B, then based on past heuristics, the probability of File C to be accessed is greatest, and the ranking utility 252 is configured to rank File C with a high priority.

Another example of "near-time application usage" is to analyze a history of specific times or days when an object is accessed and predict a next access. For example, the ranking utility 252 may determine that specific files/directories are accessed near the end of each month. Accordingly, the ranking utility 252 is configured to assign a priority to these files/directories that causes the FSCK utility 153 to scan these files/directories before the predicted application usage time. By not locking and scanning the files during the predicted application usage time, an application crash due to corrupted or unavailable files is beneficially minimized.

Another example of a prioritization mode 302 is a history based on access frequency, or in other words, a "file heat." The ranking utility 252 may be configured to analyze a metadata attribute of a file or directory that indicates how frequently the file or directory is accessed. The metadata attribute may be a counter of the number of times the file or directory is accessed. The ranking utility 153, in this example, is configured to prioritize these highly accessed files so that the FSCK utility 153 scans these files first and any corruption will be identified and corrected as early as possible.

Another example of a prioritization mode 302 is a backup status. For example, the ranking utility 252 may be configured to analyze a backup or migration status and prioritize files/directories based on the backup or migration status. The backup or migration status, for example, may be a metadata attribute that indicates a file/directory is due to be backed up or migrated. In this example, the FSCK utility 153 scans these files first to prevent corrupt data from being backed up or migrated.

Another example of a prioritization mode 302 is an indication of file/directory location with respect to the FSCK utility 153. For example, in a shared nothing environment, where data is local to a computing node or storage controller 136, the ranking utility 252 is configured to prioritize objects/inodes which are located on the same computing node as the currently operating FSCK utility 153. After completion of a scan, the FSCK utility 153 may be move to another computing node or storage controller 136. This beneficially improves the speed of a scan for corrupted objects.

Another example of a prioritization mode 302 is to identify matches of file metadata or file content with a predetermined rule. For example, the file system may be configured to categorize files based on file content or file metadata according to a predetermined business rule. A business rule, as known by those of skill in the art, may define that a certain category of file is of greater importance than another. The ranking utility 252 is configured to prioritize these files so that the FSCK utility 153 scans these files first and identifies corruption as early as possible.

In view of the exemplary hardware structures depicted in FIGS. 1, 2, and 3 previously, the mechanisms of the present disclosure may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like. The mechanisms of the illustrated embodiments, among other functionality, implement new methodologies to ensure data is not corrupted by misconfigured host applications, storage drivers, filesystem control software, or other general operating system issues.

Figure 4:
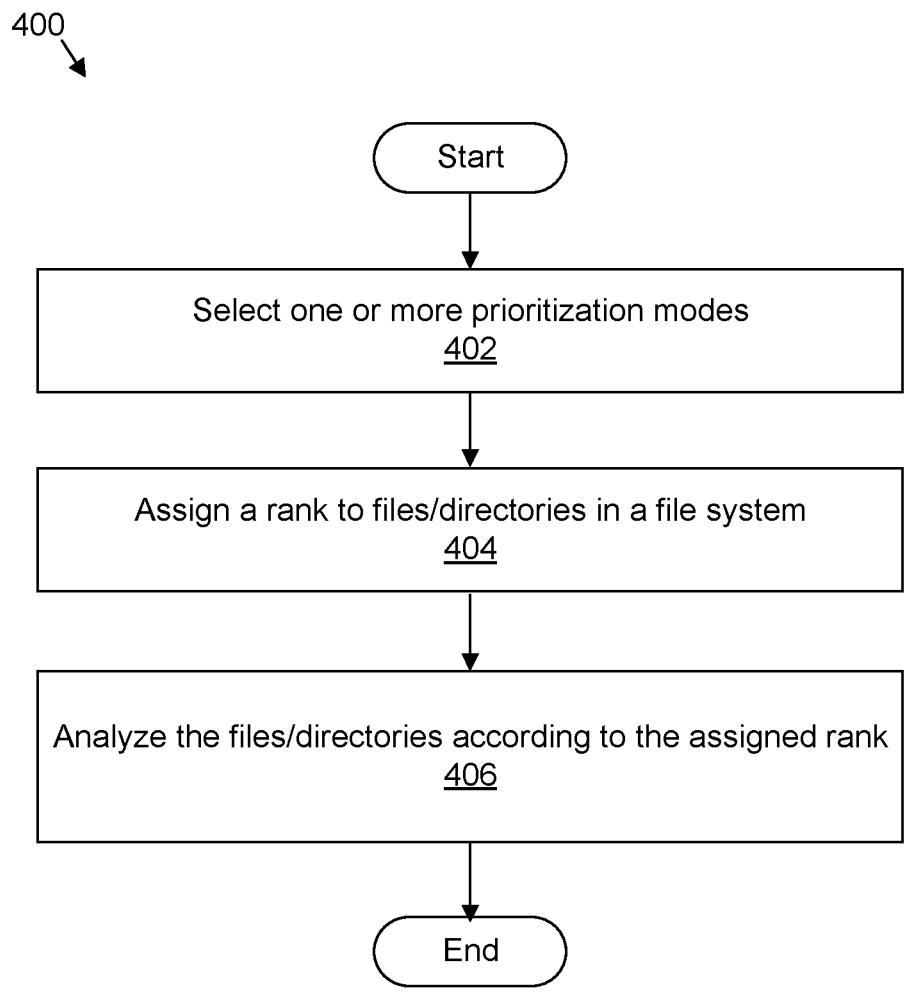
FIG. 4 is a flowchart diagram illustrating one embodiment of a method for selecting a prioritization mode and assigning a rank based on the prioritization mode in accordance with examples of the present disclosure.

FIG. 4 is a flowchart diagram illustrating one embodiment of a method 400 for selecting a prioritization mode and assigning a rank based on the prioritization mode in accordance with examples of the present disclosure. The method 400 may be performed by processing logic that may comprise hardware (e.g., circuitry, dedicated logic, programmable logic, microcode, etc.), software (such as instructions run on a processing device), firmware, or a combination thereof. In one embodiment, the method 400 is performed by the FSCK utility 153.

The method 400 starts and the processing logic, at block 402, selects one or more prioritization modes 302. Multiple prioritization modes 302 may be provided, as described above with reference to FIG. 3. In certain examples, a single prioritization mode 302 is selected. In other examples, multiple prioritization modes 302 are selected, with each prioritization mode being weighted equally toward the calculation of the rank. In other examples, a first prioritization mode 302 is given a higher weight than a second, third, or fourth prioritization mode 302. It is contemplated that any weighting of combined prioritization modes 302 is possible.

At block 404, the processing logic assigns a rank to files/directories in a file system based on the selected prioritization mode 302. Files/directories may be ranked individually by the processing logic, or in the alternative, placed into one or more prioritization buckets. For example, the processing logic may designate a high-priority bucket, a medium-priority bucket, and a low-priority bucket, or any number of reasonable buckets.

At block 406, the processing logic analyzes the files/directories according to the assigned ranks. In certain examples, the processing logic analyzes files/directories individually according to the assigned ranking. In some examples, the processing logic analyzes files/directories in batches according to the assigned ranking. For example, the processing logic may analyze, as a batch, an entire high-priority bucket.

Figure 5:
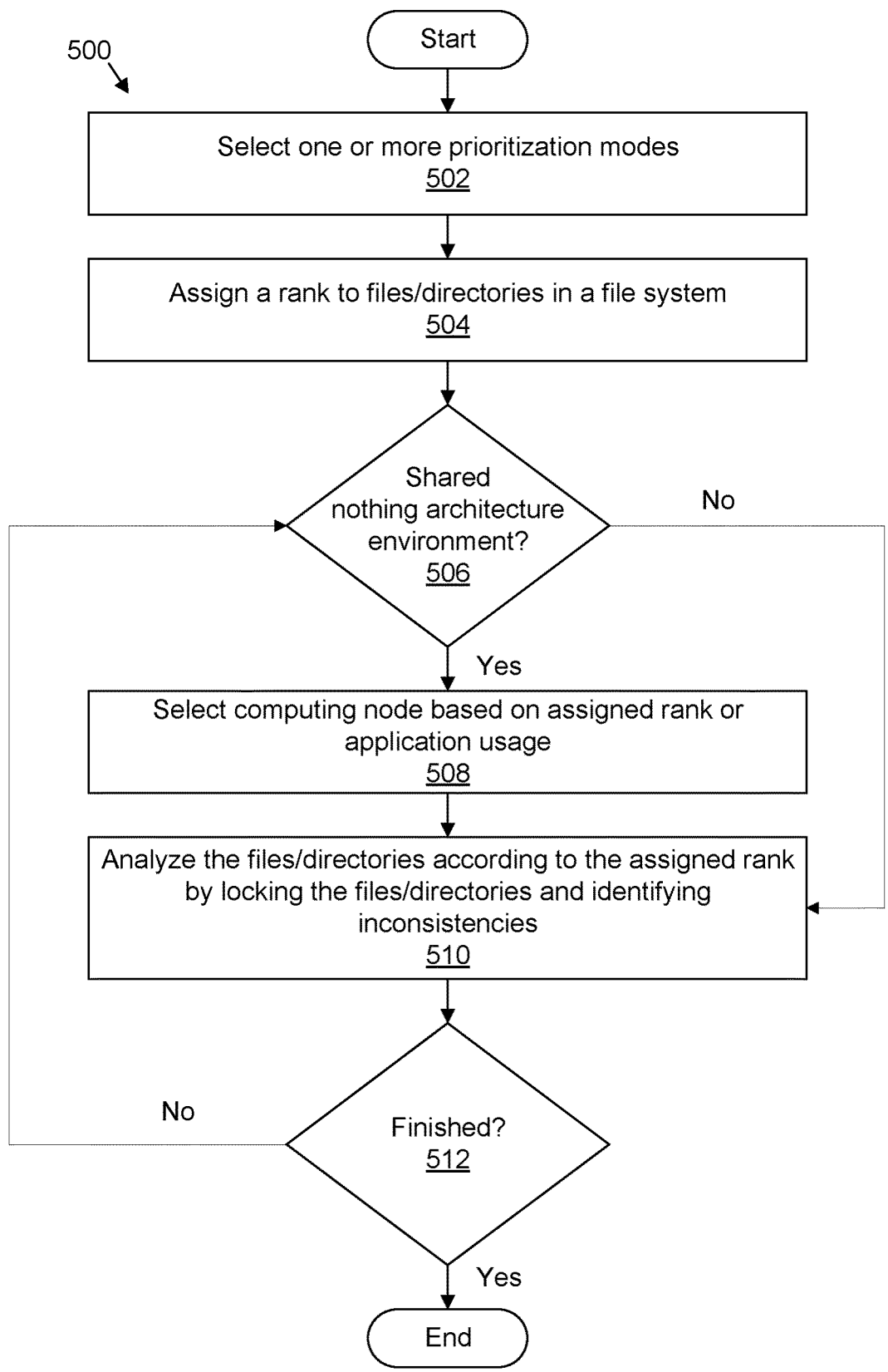
FIG. 5 is a flowchart diagram illustrating one embodiment of a method for selecting a prioritization mode and assigning a rank based on the prioritization mode in accordance with examples of the present disclosure.

FIG. 5 is a flowchart diagram illustrating one embodiment of a method 500 for selecting a prioritization mode and assigning a rank based on the prioritization mode in accordance with examples of the present disclosure. The method 500 may be performed by processing logic that may comprise hardware (e.g., circuitry, dedicated logic, programmable logic, microcode, etc.), software (such as instructions run on a processing device), firmware, or a combination thereof. In one embodiment, the method 500 is performed by the FSCK utility 153.

The method 500 starts and the processing logic, at block 502, selects one or more prioritization modes 302. Multiple prioritization modes 302 may be provided, as described above with reference to FIG. 3. In certain examples, a single prioritization mode 302 is selected. In other examples, multiple prioritization modes 302 are selected, with each prioritization mode being weighted equally toward the calculation of the rank. In other examples, a first prioritization mode 302 is given a higher weight than a second, third, or fourth prioritization mode 302. It is contemplated that any weighting of combined prioritization modes 302 is possible.

At block 504, the processing logic assigns a rank to files/directories in a file system based on the selected prioritization mode 302. Files/directories may be ranked individually by the processing logic, or in the alternative, placed into one or more prioritization buckets. For example, the processing logic may designate a high-priority bucket, a medium-priority bucket, and a low-priority bucket, or any number of reasonable buckets.

At decision block 506, the processing logic determines if the method 500 is performed in a shared nothing architecture environment, and if so, selects a computing node based on the assigned rank or application usage at block 508. For example, if the processing logic determines that the assigned rank identifies files that are targeted by a specific application, the processing logic may move to that specific computing node and analyze, at block 510, the files/directories according to the assigned rank. In certain examples, the processing logic analyzes the files/directories by locking the files/directories and identifying inconsistencies.

If, at decision block 506, the processing logic determines that the method 500 is not performed in a shared nothing architecture environment, the method 500 proceeds to block 508 as described above. Following the analyzing of block 510, the processing logic determines, at block 512, if any further inodes or files/directories need analyzing. If the determination is yes, the method 500 returns to block 506.

The embodiments may be practiced in other specific forms. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
one or more processors;
one or more non-transitory computer-readable storage media, the one or more non-transitory computer readable storage media comprising executable code, that when executed by the one or more processors, causes the one or more processors to:
select a prioritization mode from a plurality of prioritization modes;
assign a rank, based on the selected prioritization mode, to files in a mounted file system;
analyze, according to the assigned rank, the files to identify corrupted files; and
lock a file in the mounted file system according to the assigned rank, perform a file system consistency check (FSCK) of the file, and unlock the file.

2. The apparatus of claim 1, where the selected prioritization mode causes the one or more processors to assign the rank of each of the files in response to a probability based on recent file access.

3. The apparatus of claim 1, where the selected prioritization mode causes the one or more processors to assign the rank of each of the files in response to a history based on a time of access of the files.

4. The apparatus of claim 1, where the selected prioritization mode causes the one or more processors to assign the rank of each of the files in response to a history based on access frequency.

5. The apparatus of claim 1, where the selected prioritization mode causes the one or more processors to determine a backup status of each of the files, and assign the rank to each of the files based on the determined backup status.

6. The apparatus of claim 1, where the selected prioritization mode causes the one or more processors to determine a location of each of the files, and assign the rank to each of the files based on the determined location.

7. The apparatus of claim 6, where a file system consistency check (FSCK) utility is operable on a computing node that is configured to store a portion of the file system, and where the selected prioritization mode causes the one or more processors to assign a higher rank to files of the file system that are located on a same computing node as the FSCK utility.

8. The apparatus of claim 7, further comprising executable code that causes the one or more processors to move the FSCK utility to a second computing node.

9. The apparatus of claim 1, where the selected prioritization mode cause the one or more processors to analyze one of a file metadata or file content of each of the files and assign the rank based on a match of the file metadata or the file content with a predetermined rule.

10. The apparatus of claim 1, where the selected prioritization mode comprises a weighted combination of a first prioritization mode and a second prioritization mode.

11. A method comprising:
selecting a prioritization mode from a plurality of prioritization modes;
assigning a rank, based on the selected prioritization mode, to files in a mounted file system;
analyzing, according to the assigned rank, the files to identify corrupted files; and
locking, according to the assigned rank, a file, performing a file system consistency check (FSCK) of the file, and unlocking the file.

12. The method of claim 11, further comprising assigning the rank of each of the files in response to a probability based on recent file access.

13. The method of claim 11, further comprising assigning the rank of each of the files in response to a history based on a time of access of the files.

14. The method of claim 11, further comprising assigning the rank of each of the files in response to a history based on access frequency.

15. The method of claim 11, further comprising determining a backup status of each of the files, and assigning the rank to each of the files based on the determined backup status.

16. The method of claim 11, further comprising determining a location of each of the files, and assigning the rank to each of the files based on the determined location.

17. The method of claim 16, where a file system consistency check (FSCK) utility is operable on a computing node that is configured to store a portion of the file system, and where the method further comprises assigning a higher rank to files of the file system that are located on a same computing node as the FSCK utility.

18. The method of claim 17, further comprising moving the FSCK utility to a second computing node.

19. The method of claim 11, where the selected prioritization mode comprises a weighted combination of a first prioritization mode and a second prioritization mode.

20. A computer program product, the computer program product comprising a non-transitory computer readable storage medium having program instructions embodied therewith, the program instructions readable/executable by a processor to cause the processor to:
select a prioritization mode from a plurality of prioritization modes;
assign a rank, based on the selected prioritization mode, to files in a mounted file system;
analyze, according to the assigned rank, the files to identify corrupted files; and
lock, according to the assigned rank, a file, perform a file system consistency check (FSCK) of the file, and unlock the file.

* * * * *